US008331543B2

(12) United States Patent
Ramanathan et al.

(10) Patent No.: US 8,331,543 B2
(45) Date of Patent: Dec. 11, 2012

(54) RESYNCHRONIZATION OF CALL EVENTS AFTER TRIGGER EVENT

(75) Inventors: Rajesh Ramanathan, Redmond, WA (US); Brian Stucker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 882 days.

(21) Appl. No.: 12/465,385

(22) Filed: May 13, 2009

(65) Prior Publication Data

US 2010/0290606 A1 Nov. 18, 2010

(51) Int. Cl.
H04M 15/00 (2006.01)
H04M 7/00 (2006.01)
(52) U.S. Cl. .............................. 379/112.01; 379/221.04
(58) Field of Classification Search ............. 379/112.01, 379/112.02, 126, 133, 221.03, 221.04
See application file for complete search history.

(56) References Cited

U.S. PATENT DOCUMENTS

| | | | |
|---|---|---|---|
| 5,517,555 A | 5/1996 | Amadon et al. | |
| 6,385,444 B1 * | 5/2002 | Peschel et al. | 455/405 |
| 6,498,839 B2 | 12/2002 | Rojas | |
| 6,658,099 B2 | 12/2003 | Perkins, III | |
| 7,085,360 B1 * | 8/2006 | Sprouse | 379/114.04 |
| 7,231,024 B2 * | 6/2007 | Moisey et al. | 379/126 |
| 7,231,026 B2 | 6/2007 | Lampell et al. | |
| 7,386,114 B1 | 6/2008 | Robesky | |
| 7,450,931 B2 | 11/2008 | Alston | |
| 2004/0034636 A1 | 2/2004 | Vallur et al. | |
| 2006/0116113 A1 | 6/2006 | Gass | |

OTHER PUBLICATIONS

"Application Notes for TriVium Systems CallAnalyst Enterprise Server with Avaya Communication Manager—Issue 1.0", Retrieved at <<https://avaya.com/master-usa/en-us/resource/assets/applicationnotes/callanalyst-acm.pdf>>, Apr. 16, 2006, pp. 1-21.
"Cisco Agent Desktop User Guide", Retrieved at <<http://www.cisco.com/en/US/docs/voice_ip_comm/cust_contact/contact_center/crs/express_3_1/user/cad/agent_desktop_user_guide.pdf, May 14, 2003, pp. 40.
"TeleMate Deployments", Retrieved at <<http://www.telemate.net/products/telemate/deployments.php, Mar. 23, 2009, pp. 2.

* cited by examiner

Primary Examiner — Quoc D Tran
(74) Attorney, Agent, or Firm — Turk IP Law, LLC

(57) ABSTRACT

Client devices/applications associated with a subscriber of an enhanced communication system are enabled to generate communication records identifying individual communication sessions along with tie-breaker values such that the records can be evaluated following a trigger event and duplicate records for the same subscriber can be removed in order to provide accurate information to the subscriber when the event is over.

20 Claims, 6 Drawing Sheets

RESYNCHRONIZATION OF CALL EVENTS AFTER TRIGGER EVENT

BACKGROUND

Modern communication systems have a large number of capabilities including integration of various communication modalities with different services. For example, instant messaging, voice/video communications, data/application sharing, white-boarding, and other forms of communication may be combined with presence and availability information of subscribers. Such systems may provide subscribers with the enhanced capabilities such as providing instructions to callers for various status categories, alternate contacts, calendar information, and comparable features.

Subscribers of enhanced communication systems with above described capabilities may employ multiple client devices and/or applications to facilitate their communications. For example, a subscriber may use a handheld device for text messaging, a desktop computer for audio and video communications, as well as application sharing. Some or all of these devices/applications may be active at the same time or at different times.

When multiple clients for the same subscriber are isolated from a server of the communication system due to an event like network outage between the client(s) and the network, different call logs may be generated by the clients for the same external event. A given client may not have the means to discover that duplicate records are being generated. As a result, inaccurate call log information may be displayed to the user when network connectivity is restored to prevent.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling client devices/applications of an enhanced communication system to generate communication records identifying individual communication sessions along with tie-breaker values such that the records can be evaluated following a trigger event and duplicate records from client devices/applications for the same subscriber can be filtered in order to provide accurate information to the subscriber when the event is over.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
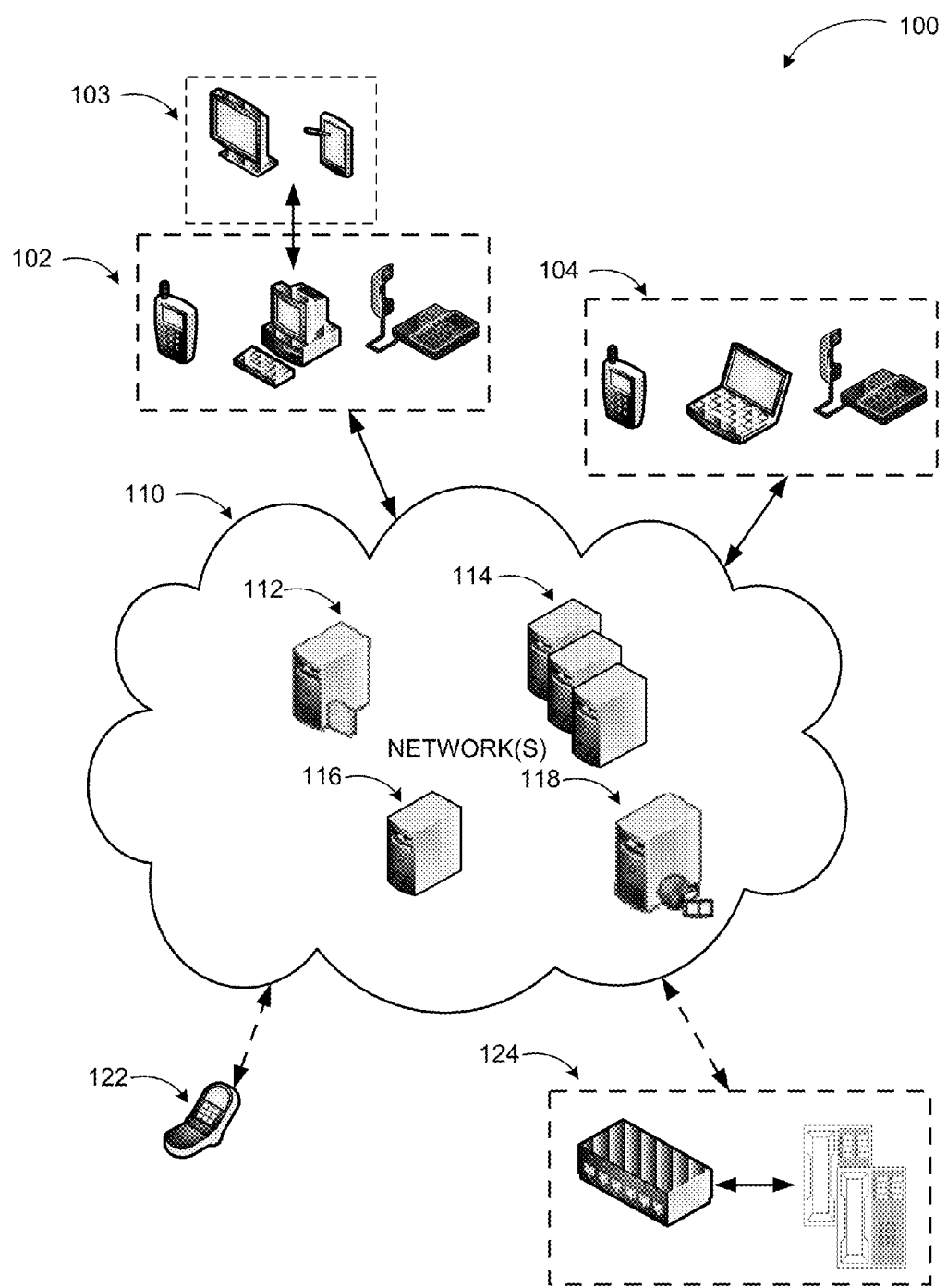
FIG. 1 is a diagram illustrating an example unified communications system, where embodiments may be implemented for resynchronization call events following a trigger event.

As briefly described above, communication records identifying individual communication sessions along with tie-breaker values may be employed in an enhanced communication system to evaluate the records following a trigger event and to remove duplicate records from client devices/applications for the same subscriber in order to provide accurate information to the subscriber when the event is over. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below. The term "client" refers to client devices and/or applications. The term "call" is used herein to refer to any communication session within an enhanced communication system. As such a "call" may include an audio communication, a video communication, a data sharing session, a text messaging session, an application sharing session, a whiteboard sharing session, an electronic mail exchange, and similar ones. Similarly, the term "call log" refers to records generated and maintained by the clients or by the servers of the enhanced communication system.

Referring to FIG. 1, diagram 100 of an example unified communications system, where embodiments may be practiced, is illustrated. A unified communication system is an example of enhanced communication systems with a wide range of capabilities and services that can be provided to subscribers. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. For some of the advanced communication modes, the end devices may be used in conjunction with peripheral devices 103 such as external monitors, speakers, microphones, and similar ones. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers. End devices may also include various peripherals coupled to the end devices through wired or wireless means (e.g. USB connection, Bluetooth® connection, etc.) to facilitate different aspects of the communication.

UC Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

As mentioned above, embodiments may be implemented in enhanced communications systems such as UC systems facilitating multimodal communications. Multimodal communication sessions are also referred to as conversations, where subscribers may communicate over a plurality of devices, applications, and communication modes simultaneously or sequentially. For example, two subscribers may initiate a conversation by exchanging instant messages through their desktop computers. Later, the communication may be elevated to audio and instant message with one subscriber utilizing their desktop for both modes, while the other uses the desktop computer for instant messaging and a smart phone device for the audio mode. Other subscribers may join or leave the conversation other modes and devices may be added or removed. The commonality between these communications is preserved by designating all these communications as belonging to the same conversation. Conversations may be assigned a unique identifier, which enables subscribers to view, record, modify, share, and generally manage aspects of the conversation including documents and other data associated with the conversation (e.g. documents exchanged as attachments in one mode of the conversation or recordings of other modes of the conversation). Moreover, individual sessions that are part of a conversation may also be assigned their own unique identifiers in "call logs" according to some embodiments.

While the example system in FIG. 1 has been described with specific components such as mediation server, A/V server, and similar devices, embodiments are not limited to this system of the example components and configurations. An enhanced communication system facilitating resynchronization of call events after a trigger event may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
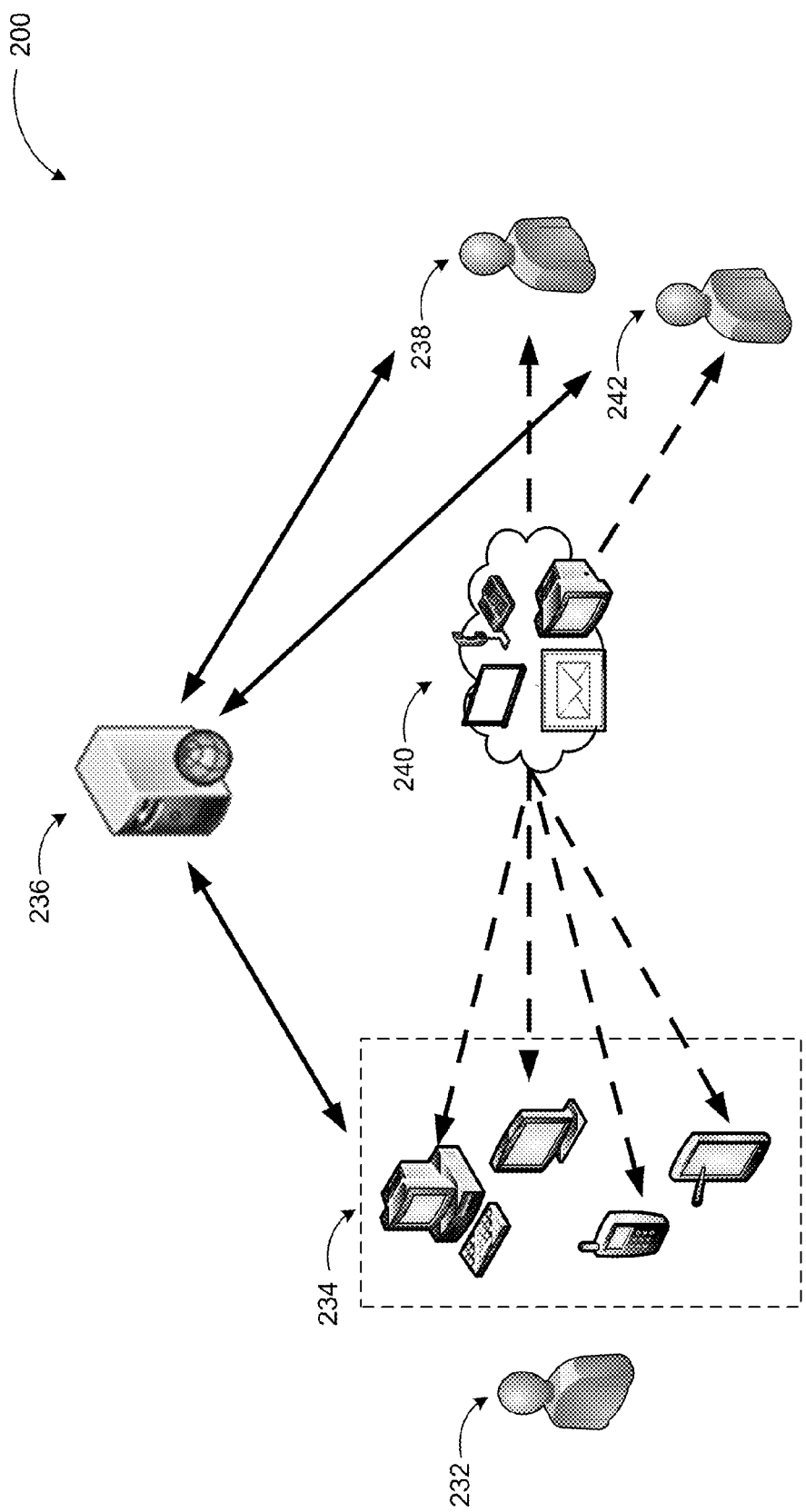
FIG. 2 is a conceptual diagram illustrating a basic example system where call events may be resynchronized following a trigger event such as network outage.

FIG. 2 includes conceptual diagram 200 illustrating a basic example system for facilitating resynchronization of call events after a trigger event. While a system according to embodiments is likely to include a number of servers, client devices, and services such as those illustratively discussed in FIG. 1, only those relevant to embodiments are shown in diagram 200 of FIG. 2.

In a system according to embodiments, user 232 may communicate with other users 238 and 242 in various modalities (240) employing different client devices 234. Aspects of the communications are managed by one or more servers such as server 236. One of the aspects includes synchronization of records following a trigger event.

Embodiments provide means for detecting and eliminating duplicate call log entries in an environment where multiple, isolated, clients (e.g. client devices 234) are involved and unable to coordinate with each other due to disruption in communication such as a network outage. Correlating material may be embedded in the call log and a distributed clean-up process executed to rectify the call logs and eliminate duplicate entries. Embodiments are not limited to unified communication systems such as Microsoft Office Communicator System® by Microsoft Corp. of Redmond, Wash., but can be implemented in any system where multiple clients are logging the same event to a centralized collection point that is unavailable and wish to consolidate the various logs into a single instance.

The generation, maintenance, and synchronization of the communication records or call logs may also be performed by other devices in the system such as multipurpose servers, dedicated servers, and comparable ones in a centralized or distributed fashion. The communication modes discussed above do not constitute a limitation on embodiments. Any communication modality may be employed in implementing a resynchronization of call logs following a trigger event according to embodiments.

Figure 3:
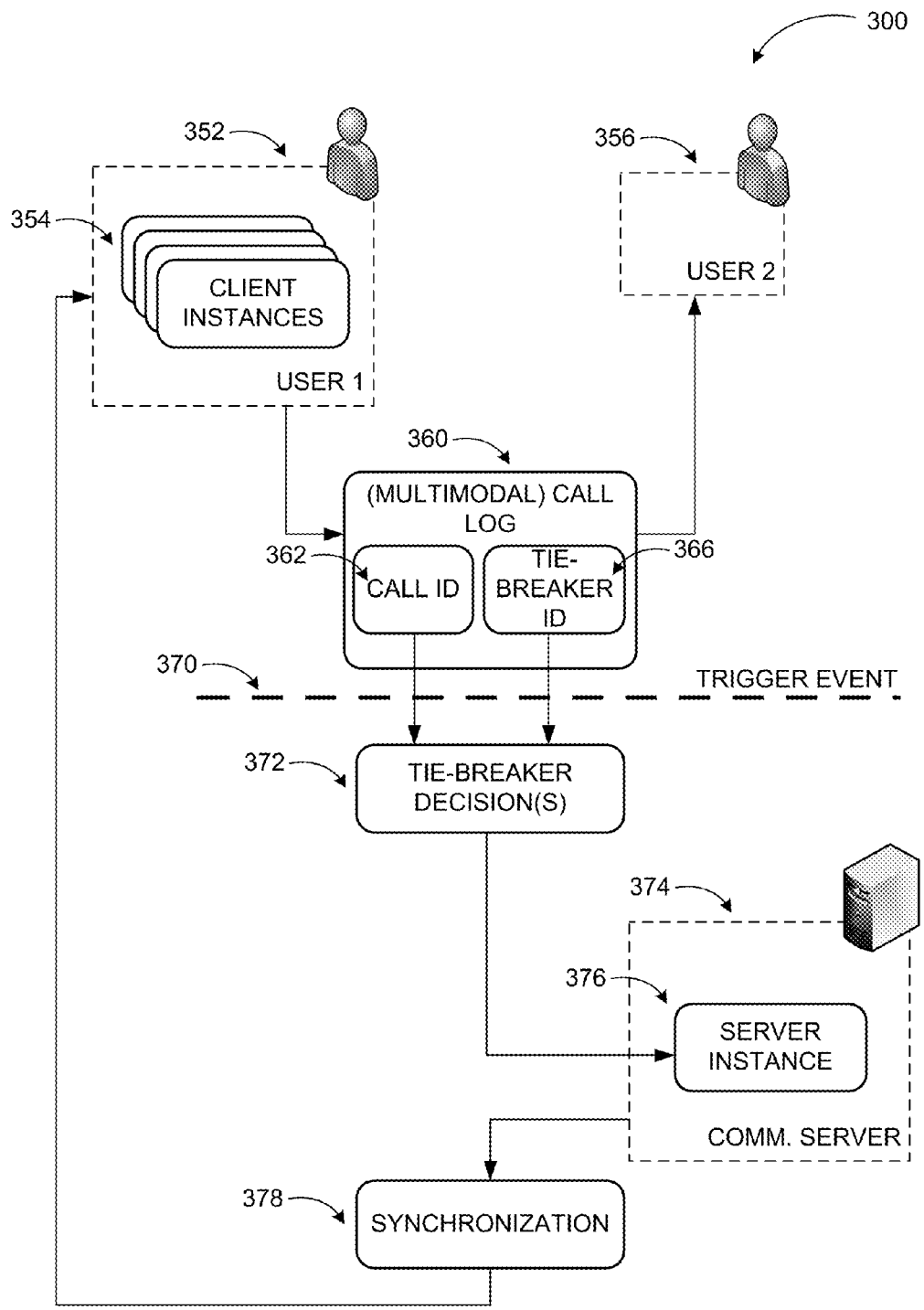
FIG. 3 illustrates major components and actions in an enhanced communication system with call event resynchronization after a trigger event according to embodiments.

FIG. 3 includes diagram 300 illustrating major components and actions in an enhanced communication system with resynchronization of call events after a trigger event according to embodiments.

Users 1 and 2 (352 and 356) are subscribers of an enhanced communication system such as a unified communication system. As such, users 352 and 356 may employ multiple end devices and/or applications with different communication capabilities such as those described above. Thus, each user has different instances of their clients (devices/applications) 354.

When a call reaches an instance of one of User 1's clients, that client may generate and upload a log to a communication server 374 to track the details of the call. In the event that multiple clients are logging the same event (e.g. multiple client instances are notified for the same inbound call to a single user) and no synchronization mechanism or connectivity to the communication server exists at the time (trigger event 370), each client generates a separate call log instance 360 to describe the event (e.g. an inbound call, an outbound call, etc.).

The client may include a SIP call identifier or other common correlation identifier 362 that is communicated to all of the client instances for the given call in the call log. The server instance 376 that routes the call to the clients ensures that the call/correlation identifier is unique from call to call, but the same when sent to all of the clients contacted for a given call. The call log may include information associated with an inbound communication, an outbound communication, a content session, an application sharing invite, and/or a data sharing invite.

Additionally, the client may include a tie-breaker identifier 366 such as a Universally Unique Identifier (UUID) or the SIP via header branch field in the call log. The call log instance may then be spooled independently at each client. When connectivity to communication server 374 is restored, each client may upload the spooled call log to the same server instance 376. This causes communication server 374 to forward each uploaded call log to the other client instances. At this point, if there are N clients that generated a call log for the same call event, there are N call logs at each client. The client instances 354 go through an evaluation process categorizing logs for the same event based on call identifiers and selecting a winner among duplicate logs for the same call based on tie-breaker values (tie-breaker decision 372). Remaining duplicate records may be marked for deletion and communication server 374 notified such that records can be updated by the server and all client instances synchronized (378) with the updated and accurate call log information.

In an example embodiment, a client may go through following process to eliminate duplicate call records: (1) all call logs with the same call/correlation identifier are grouped into buckets; (2) within each bucket, the call log with the highest tie-breaker value is retained and the other entries are marked for deletion; (3) the to-be-deleted call log entries are synchronized with communication server once more; (4) server synchronization is received once again by all clients (for the same subscriber), indicating that entries have been deleted; and (5) the process may be repeated with step 1 until there is only one entry in each call log bucket. The tie-breaker decision may be based on other criteria as well. For example, a tie-breaker identifier with lowest value may be selected.

The above discussed scenarios, example systems, modalities, trigger events, and configurations are for illustration purposes. Embodiments are not restricted to those examples. Other forms of notifications, configurations, communication modes, and scenarios may be used in implementing resynchronization of call events after a trigger event in a similar manner using the principles described herein.

Figure 4:
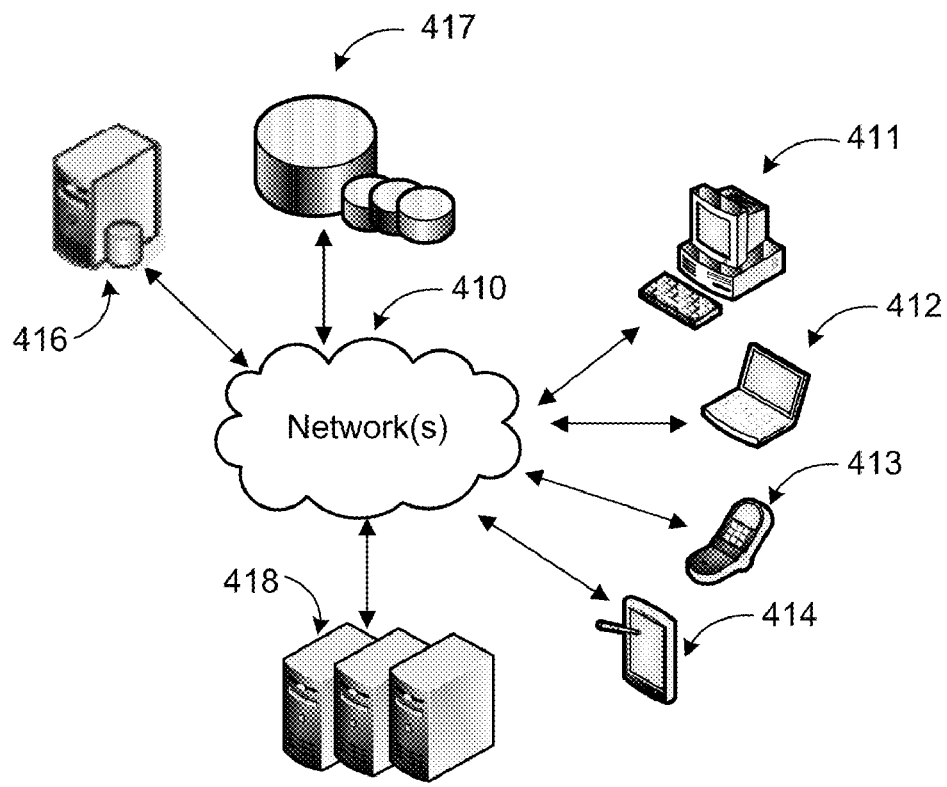
FIG. 4 is a networked environment, where a system according to embodiments may be implemented.

FIG. 4 is an example networked environment, where embodiments may be implemented. An enhanced communication system providing communication services including resynchronization of call events after a trigger event may be implemented via software executed over one or more servers 418 such as a hosted service. The system may facilitate communications between client applications on individual computing devices such as a handheld computer 414, smart phone 413, a laptop computer 412, and desktop computer 411 ('client devices') through network(s) 410.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services and communication modes may be enabled.

Client devices 411-414 are used to facilitate communications through a variety of modes between subscribers of the communication system. Some of the client devices 411-414 may be associated with the same subscriber and generate call logs following a trigger event such as loss of connection to one or more of the servers 418. The records may include a call identifier and a tie-breaker value such that the client device 411-414 may evaluate the logs after connection is restored and remove duplicate records based on tie-breaker values in order to provide accurate information to the subscriber. Information associated with subscribers and facilitating multimodal conversations, as well as call logs and other data, may be stored in one or more data stores (e.g. data store 417), which may be managed by any one of the servers 418 or by database server 416.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a communication system with resynchronization of call events after a trigger event. Furthermore, the networked environments discussed in FIG. 4 are for illustration purposes only. Embodiments are not limited to the example applications, modules, or processes.

Figure 5:
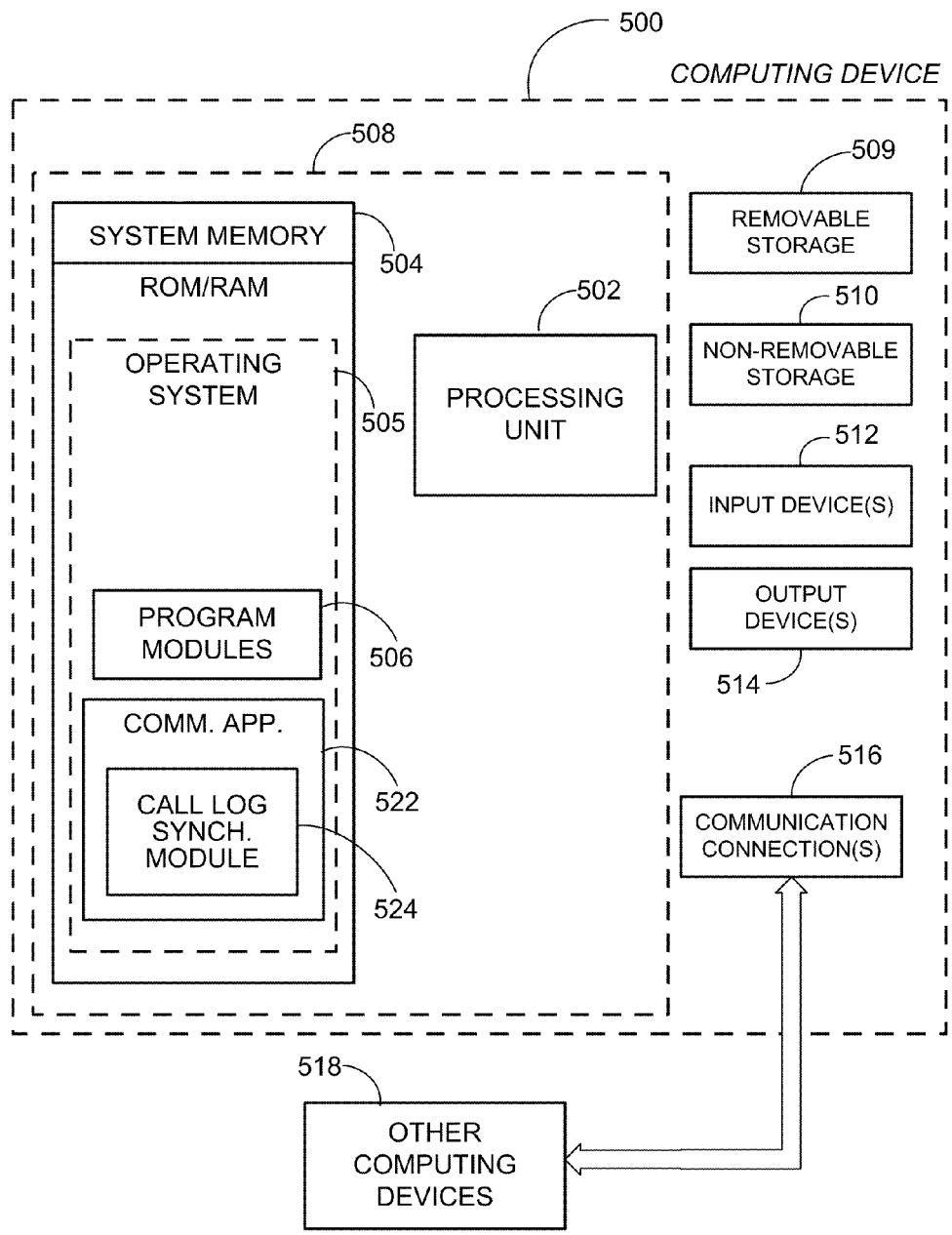
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a client device as part of an enhanced communication system and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS ® operating systems from MICROSOFT CORPORATION of Redmond, Wash. The system memory 504 may also include one or more software applications such as program modules 506, communication application 522, and call log synchronization module 524.

Communication application 522 may be part of a service that facilitates communication through various modalities between client applications, servers, and other devices. Call log synchronization module 524 may enable client applications to generate records of communication sessions including a call identifier (for any type of communication) and a tie-breaker value following a trigger event such that the records may be evaluated later and duplicate records among client devices of the same subscriber can be removed. This basic configuration is illustrated in FIG. 5 by those components within dashed line 508. In a system according to embodiments, records may be synchronized through communication with dedicated servers for each of the distinct modalities of the conversation, multipurpose servers, or a combination of servers and endpoints of the communication system.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, other directory or policy servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
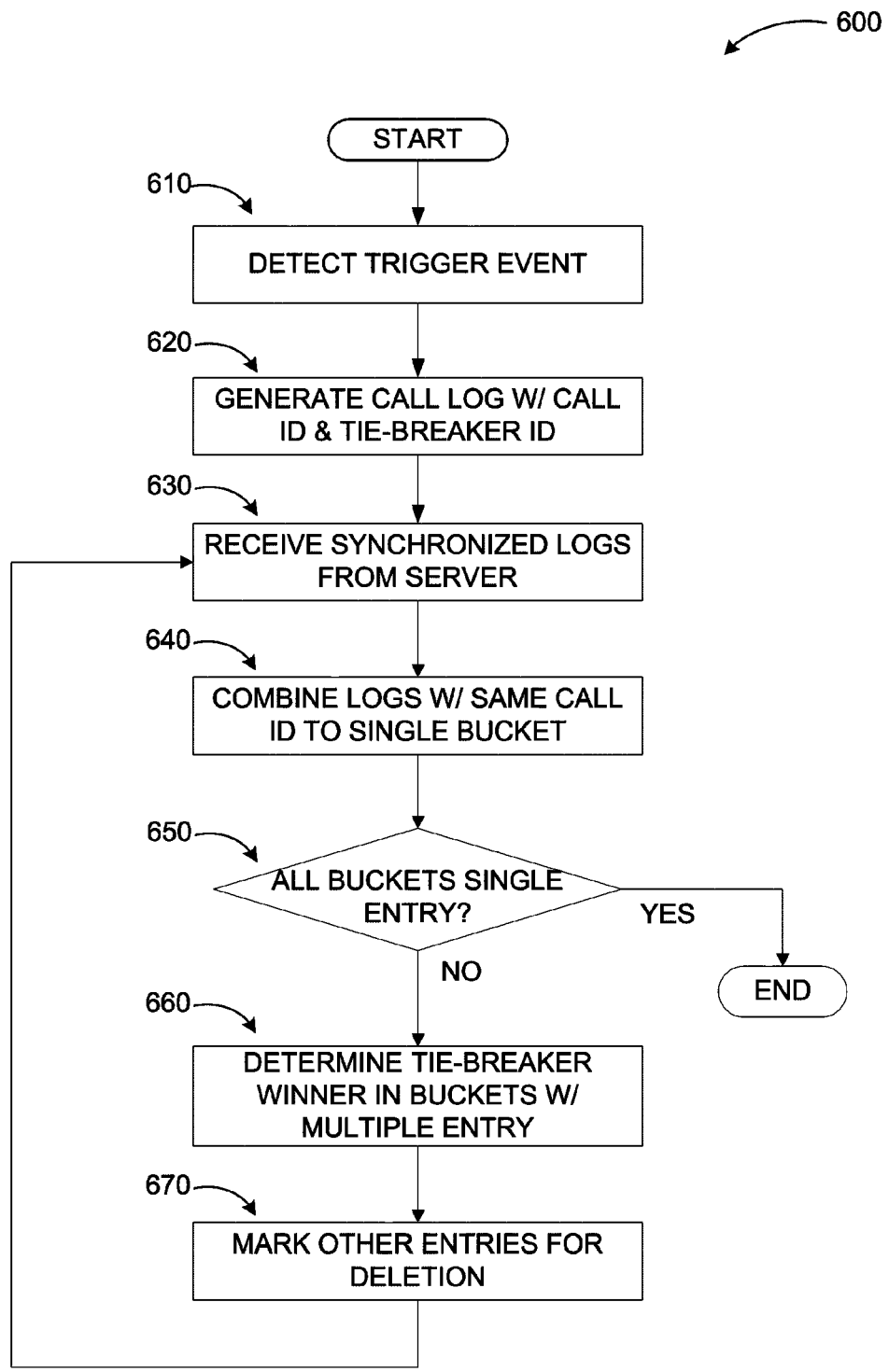
FIG. 6 illustrates a logic flow diagram for resynchronizing call events after a trigger event in an enhanced communication system according to embodiments.

FIG. 6 illustrates a logic flow diagram for process 600 of resynchronizing call events after a trigger event in an enhanced communication system according to embodiments. Process 600 may be implemented as part of a communication system that facilitates multiple communication modes.

Process 600 begins with operation 610, where a trigger event is detected. Trigger event may be any unexpected event such as disruption of communication between the clients of the subscriber and one or more servers of the system, a configuration change, and similar ones. At operation 620, a call log with call identifier and a tie-breaker value are generated. As mentioned previously, the term call refers to any type of communication as used herein. Therefore, call logs may include text message records, audio communication records, video communication records, application/data sharing session records, and comparable ones. Furthermore, the logs may include information associated with inbound or outbound calls (e.g. invite messages for various communication sessions). These call logs are submitted to the server upon completion of the event (e.g. restoration of connection to the server).

At operation 630, synchronized logs are received from the server. For example, a subscriber may employ three different clients. Each of the clients may generate separate logs and submit to the server. Some of those logs are for the same communication session. The server may ensure that the call identifiers reflect the fact that the records are for the same session. However, tie-breaker values are bound to be different for the records generated by each client.

At operation 640, the clients combine the received call logs into groups (also called 'buckets'). In an ideal situation, where no duplicate records are generated, all buckets may have single entry. If that is the determination made at decision operation 650, processing ends, since no records need to be filtered or removed before displaying to the subscriber.

If some buckets include multiple entries (duplicate call logs), the records in each of those buckets are filtered based on the tie-breaker values at operation 660. Logs other than the winning one, are marked for deletion at following operation 670, and processing returns to operation 630 such that the client(s) can synchronize their records based on the updated information and display accurate information to the subscriber.

The operations included in process 600 are for illustration purposes. A communication service with resynchronization of call logs after a trigger event may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for synchronizing communication session records, the method comprising:
   upon detecting a trigger event, generating a call log at each client associated with a subscriber, wherein each log includes a session identifier and a tie-breaker identifier;
   receiving call logs submitted by all clients associated with the subscriber at each client from a server upon completion of the trigger event;
   categorizing call logs containing same session identifiers;
   if more than one call log exists for a communication session, selecting one of the call logs based on tie-breaker identifier values and marking remaining call logs for deletion;
   reporting updated call logs to the server; and
   receiving resynchronized call log information from the server at each client.

2. The method of claim 1, further comprising:
   updating call logs at each client based on the resynchronized call log information; and
   making the updated call logs available to the subscriber at each client.

3. The method of claim 2, further comprising:
   reporting the generated call logs to the server.

4. The method of claim 1, wherein the trigger event is a disruption of communication between the clients and the server.

5. The method of claim 1, wherein the session identifier includes one of: a Session Initiation Protocol (SIP) identifier and a common correlation identifier.

6. The method of claim 5, wherein the server is configured to ensure the session identifier is unique for each communication session and same for each client employed for the same communication session.

7. The method of claim 1, wherein the tie-breaker identifier includes one of a Universally Unique Identifier (UUID) and a SIP via header branch.

8. The method of claim 7, further comprising:
   selecting one of the call logs based a value of the tie-breaker being one of:
   highest and lowest among the tie-breaker identifiers for the same communication session.

9. The method of claim 1, wherein the communication session includes at least one from a set of: audio communication, video communication, an application sharing session, a data sharing session, a whiteboard sharing session, an electronic mail exchange, and an instant message session.

10. The method of claim 1, wherein the call log includes information associated with at least one from a set of: an inbound communication, an outbound communication, a content session, an application sharing invite, and a data sharing invite.

11. A communication system for synchronizing communication session records between clients associated with a subscriber of the system, the system comprising:
    a plurality of client instances associated with the subscriber, each client instance configured to:
       generate a call log associated with a communication session, wherein each call log includes a session identifier unique to each session and a tie-breaker value unique to each session and each client;
       report the generated call logs to the communication system;
       following a network outage, receive call logs submitted by all clients associated with the subscriber at each client instance upon restoration of the network communication;
       group call logs containing same session identifiers at each client instance;
       if more than one call log exists for a communication session, select one of the call logs based on tie-breaker values and mark remaining call logs for deletion;
       report marked call logs to the communication system;
       receive resynchronized call log information based on the marked call logs at each client instance; and
       update the call logs at each client instance based on the resynchronized call log information.

12. The system of claim 11, wherein the client instances are configured to facilitate at least one modality of communication as part of a conversation between subscribers of the communication system.

13. The system of claim 11, wherein the call logs include information associated with at least one from a set of: an inbound session invite, an outbound session invite, and an established session.

14. The system of claim 11, further comprising at least one of: a dedicated server, a multipurpose server, and a combination of servers and endpoints of the communication system configured to receive, synchronize, and resubmit the call logs to the client instances.

15. The system of claim 11, wherein the communication system is implemented as one of: a single network system in an enterprise environment and a multi-network system in a federated environment.

16. A computer-readable storage medium with instructions stored thereon for synchronizing communication session records, the instructions comprising:
- generating a call log at each client associated with a subscriber, wherein each call log includes a session identifier unique to each session and a tie-breaker value unique to each session and each client;
- reporting the generated call logs to a server;
- following a communication disruption between the clients and the server, receiving call logs submitted by all clients associated with the subscriber at each client from the server upon restoration of the communication between the clients and the server;
- categorizing call logs containing same session identifiers at each client;
- if more than one call log exists for a communication session, selecting one of the call logs based on tie-breaker values and marking remaining call logs for deletion;
- reporting marked call logs to the server;
- receiving resynchronized call log information based on the marked call logs from the server at each client;
- updating call logs at each client based on the resynchronized call log information; and
- making the updated call logs available to the subscriber at each client.

17. The computer-readable medium of claim 16, wherein call logs marked to be deleted are removed from the server.

18. The computer-readable medium of claim 16, wherein the session identifier includes one of: a SIP identifier and a common correlation identifier, and wherein the tie-breaker value includes one of: a UUID value and a SIP via header branch field value.

19. The computer-readable medium of claim 16, wherein the client instances are isolated from each other.

20. The computer-readable medium of claim 16, wherein the client instances are associated with at least one client device associated with the subscriber.

* * * * *